US008866867B2

(12) United States Patent
Huang et al.

(10) Patent No.: US 8,866,867 B2
(45) Date of Patent: Oct. 21, 2014

(54) METHOD AND APPARATUS FOR VIDEO RECORDING IN VIDEO CALLS

(75) Inventors: Lianfang Huang, Guangdong Province (CN); Yang Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,213

(22) PCT Filed: Dec. 7, 2010

(86) PCT No.: PCT/CN2010/079516
§ 371 (c)(1),
(2), (4) Date: Sep. 6, 2012

(87) PCT Pub. No.: WO2012/034329
PCT Pub. Date: Mar. 22, 2012

(65) Prior Publication Data
US 2013/0162751 A1   Jun. 27, 2013

(30) Foreign Application Priority Data

Sep. 15, 2010   (CN) .......................... 2010 1 0290999

(51) Int. Cl.
*H04N 7/14*       (2006.01)
*H04M 3/42*       (2006.01)
(52) U.S. Cl.
CPC ............. *H04N 7/141* (2013.01); *H04M 3/4221* (2013.01); *H04M 2201/50* (2013.01); *H04M 3/42204* (2013.01); *H04N 7/147* (2013.01)
USPC .................................... 348/14.01; 348/14.05
(58) Field of Classification Search
CPC .. H04N 7/147; H04N 2007/145; H04N 7/155
USPC ........... 348/14.02, 14.01, 14.08, 14.05, 14.06
See application file for complete search history.

(56) References Cited

U.S. PATENT DOCUMENTS

| 6,233,320 | B1 * | 5/2001 | Haimi-Cohen | 379/88.27 |
| 2008/0030571 | A1 * | 2/2008 | Kim | 348/14.09 |
| 2011/0164105 | A1 * | 7/2011 | Lee et al. | 348/14.02 |
| 2011/0249073 | A1 * | 10/2011 | Cranfill et al. | 348/14.02 |
| 2014/0063174 | A1 * | 3/2014 | Junuzovic et al. | 348/14.02 |

FOREIGN PATENT DOCUMENTS

| CN | 1662057 A | 8/2005 |
| CN | 201426153 Y | 3/2010 |
| GB | 2342802 A | 4/2000 |
| WO | 2006/116644 A2 | 11/2006 |

* cited by examiner

*Primary Examiner* — Stella Woo
(74) *Attorney, Agent, or Firm* — Banner & Witcoff, Ltd.

(57) ABSTRACT

The present invention discloses a method and apparatus for recording videos in a video call. The method includes: determining a key voice input end of the video call and acquiring an image of the key voice input end; storing audio data of the video call; synthesizing the acquired image and audio, and then writing the synthesized image and audio into a recorded video file. The present invention solves the defect that the existing video call methods can not record flexibly by determining a source of a key voice, acquiring an image corresponding to the key voice, and synthesizing the image and a recorded audio, so that the sound and the image in the recorded video can be displayed correspondingly, and since only the image of the key voice input end in the call is displayed, the image in the recorded video is clearer.

10 Claims, 2 Drawing Sheets

METHOD AND APPARATUS FOR VIDEO
RECORDING IN VIDEO CALLS

TECHNICAL FIELD

The present invention relates to the field of communication technologies, and more especially, to a method and apparatus for recording videos in a video call.

BACKGROUND OF THE RELATED ART

With the rapid development of mobile multimedia services as well as the gradual commercialization of the third generation (3G for short) mobile communication technology, the video phone service becomes the 3G symbolic service and has been rapidly developed and applied in the field of personal communication. The video phone service is a point-to-point video communication service which can use the telephone network for bidirectional and real-time transmission of image and voice signals of both parties in the call. The visual terminals are able to receive an effect of face-to-face communication, and achieve the dream of "not only hear the sound, but also see the person" when the people are in a call.

During a video call, in order to record key information or share and entertain, users often need to record the videos during a call. There are three existing recording modes, i.e., recording near-end videos, recording far-end videos, and recording bidirectional videos. Wherein, the first two modes can only record one-way videos. While there are two existing types of two-way videos. One is to record two separate video files, and this method needs to store two separate files; and the other is to record only one file, but both the far-end and the near-end images should be placed at a preset location on a screen after being intercepted; however, since a plurality of video are placed on the same screen, the images may not be clear, and the display requirements on the terminal are also relatively high. In addition, if the sound is from the outside or an alternative image is used in a call, which end the sound comes from cannot be distinguished when the video is watched.

In summary, the related art has the following problems: in the existing video call recording technologies, the sound and image cannot be displayed correspondingly. Specifically, that is, the image of one end cannot be displayed according to the speaking of this end when the video is recorded.

SUMMARY OF THE INVENTION

The purpose of the present invention is to provide a method and apparatus for recording videos in a video call to solve the problem that sounds and images cannot be displayed correspondingly when recording the video call.

In order to solve the aforementioned technical problem, the present invention provides a method for recording videos in a video call, comprising:

determining a key voice input end of the video call, and acquiring an image of the key voice input end; and storing audio data of the video call, synthesizing the acquired image and the audio data, and then writing the synthesized image and audio data into a recorded video file.

In the step of determining a key voice input end of the video call, the key voice input end of the video call can be determined through a voice input source, and/or a speaking control instruction received by a terminal. In the step of determining the key voice input end of the video call through a voice input source, and/or a speaking control instruction received by a terminal, the key voice input end can be determined by one or any combination of the following modes:

making a determination according to whether there is a voice input in a microphone, and if a voice input is received in the microphone, a terminal corresponding to the microphone is the key voice input end;

making a determination according to intensity of an audio signal, and if there are a plurality of voice inputs simultaneously, taking a party that has an audio signal with a higher intensity as the key voice input end; and making a determination according to the received speaking control instruction, and after receiving a speaking start instruction initiated by the terminal, taking a party that initiates the speaking start instruction as the key voice input end.

The method can further comprise: when the key voice input end of the video call is known to be changed, acquiring an image of a new key voice input end. Wherein, the key voice input end of the video call can be known to be changed according to a received switch instruction initiated by the terminal and/or by determining the key voice input end in real-time.

The speaking control instruction and the switch instruction can be initiated via a specific key or functional menu of the terminal.

The present invention further provides an apparatus for recording videos in a video call, comprising:

a determination module, configured to determine a key voice input end;

an image writing module, configured to acquire and store an image of the key voice input end;

an audio writing module, configured to store an audio data of the video call;

a synthesis module, configured to synthesize and write the image acquired by the image writing module and the audio data acquired by the audio writing module into a recorded video file; and a storage module, configured to store the video file.

The determination module can be configured to determine the key voice input end by one or any combination of the following modes:

making a determination according to whether there is a voice input in a microphone, and if a plurality of voice inputs are received in the microphone, a terminal corresponding to the microphone is the key voice input end;

making a determination according to intensity of an audio signal, and if there are a plurality of voice inputs simultaneously, taking a party that has an audio signal with a higher intensity as the key voice input end; and making a determination according to a received speaking control instruction, and after receiving a speaking start instruction initiated by the terminal, taking a party that initiates the speaking start instruction as the key voice input end.

The apparatus can further comprise a monitoring module, and the monitoring module can be configured to monitor whether the key voice input end is changed, and notify the image writing module when the key voice input end is changed; and the image writing module can further be configured to initiate a switch operation after receiving a notification from the monitoring module to acquire and store an image of a new key voice input end. The monitoring module can be configured to monitor whether the key voice input end is changed according to determination results by the determination module.

The present invention solves the defect that the existing video call methods cannot record flexibly by determining a source of a key voice, acquiring images corresponding to the key voice and synthesizing the images and a recorded audio.

An end where the speaking is made is recorded, and the finally acquired video is similar to a form of television interview, so that the recorded video has a lager storage and playback value, which improves the user experience and also enables the video phones to be better promoted and used.

In addition, the present invention can achieve the desired effect with only minor modifications on the mobile terminal, and there is no need to make a large-scale change to software and hardware.

BRIEF DESCRIPTION OF DRAWINGS

The accompanying drawings described herein are used to provide a better understanding of the present invention and constitute a part of this application, and the schematic embodiments of the present invention and the descriptions thereof are used to explain the present invention and do not constitute a improper definition of the present invention. In the accompanying drawings.

PREFERRED EMBODIMENTS OF THE PRESENT INVENTION

Figure 1:
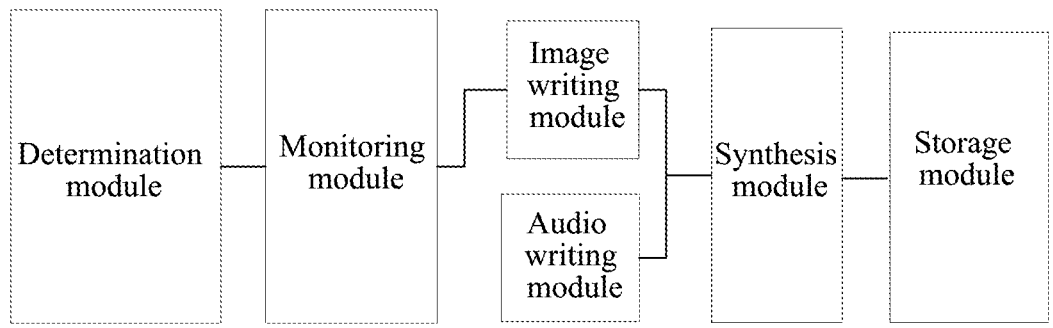
FIG. 1 is a structural diagram of an apparatus for recording videos in a video call in accordance with an example of the present invention.

The core idea of the present invention is to generate a recorded video by determining a the key audio input source and synthesizing intercepted image frames of a key voice input end and the corresponding audios. Thereby, the voices and images in the recorded video can be displayed correspondingly, and since only images of the key voice input end in the call are displayed, the images in the recorded video are clearer.

Based on the aforementioned core idea, according to one aspect of the present invention, the present invention provides a method for recording videos in a video call, and specifically, the following technical scheme is utilized:

determining a key voice input end of the video call, and acquiring an image of the key voice input end; and storing audio data of the video call, synthesizing the acquired image and said audio data, and then writing the synthesized image and audio data into a recorded video file.

Further, the key voice input end of the video call is determined via a voice input source and/or an speaking control instruction received by a terminal.

The specific determination method can use one or any combination of the following modes:

making a determination according to whether there is a voice input in the MIC (microphone), and if a voice input is received in the MIC, a terminal corresponding to the MIC is the key voice input end;

making a determination according to intensity of an audio signal, and if there are a plurality of voice inputs simultaneously, taking a party that has an audio signal with a higher intensity as the key voice input end; and making a determination according to the received speaking control instruction, after receiving a speaking start instruction initiated by the terminal, taking a party that initiates the speaking start instruction as the key voice input end.

It should be illustrated that the aforementioned method can not only be applied to a two-party call, but also can be applied to a multi-party call.

Preferably, for a two-party call, after the terminal receives the video recording instruction, whether the voice is from a far end or a near end is determined according to whether the MIC has an audio input or according to the intensity of the audio signal, and if it is at a near end, an image of the local end is directly acquired; otherwise, an image of a far end is acquired.

Further, the method further comprises: when the key voice input end of the video call is known to be changed, the image of the new key voice input end is acquired.

Further, the key voice input end of the video call is known to be changed according to a received switch instruction initiated by the terminal and/or by determining the key voice input end in real-time.

Wherein, the speaking control instruction and the switch instruction can be initiated via a specific key or functional menu of the terminal.

Further, the stored audio data comprise at least the audio data of the key voice input end, but a relatively simple implementation is to store the voice data of all the terminals involved in the video call, and can further comprise background voices in the environment or the audios shared among the terminals etc.

Further, the acquired images comprise but not limited to: images captured by a forward camera, images captured by a backward camera, alternative pictures, or pictures shared on a LCD of the video terminal etc.

According to another aspect of the present invention, the present invention further provides an apparatus for recording videos in a video call, which mainly comprises:

a determination module, configured to determine a key voice source, i.e., a key voice input end according to whether there is an audio signal, intensity of the signal or a speaking control instruction;

a monitoring module, configured to monitor whether the key voice source is changed, and notify an image writing module if the key voice source is changed;

the image writing module, configured to intercept and store image frames of the key voice input end (far end or near end);

an audio writing module, configured to store a key voice in the call;

a synthesis module, configured to synthesize an image acquired by the image writing module and the audio of the audio writing module; and a storage module, configured to store the synthesized video.

The present invention will be described in detail with respect to accompanying drawings and in conjunction with examples hereinafter. It should be illustrated that without conflict, the examples and the features of the examples in the application can be combined with each other.

FIG. 1 is a structural diagram of an apparatus for recording videos in a video call in accordance with an embodiment of the present invention, which can be applied to a mobile or fixed terminal supporting the video call. As shown in FIG. 1, the apparatus comprises:

a determining module 102, configured to determine a key audio source according to conditions of various terminal in the call, and the determination method comprises two modes, i.e., the intensity of the audio signal and instruction control;

a monitoring module 104, configured to continuously acquire results of the determination module, and monitor whether the key audio source is changed, if there is a change, record a corresponding number or terminal, and notify an image writing module;

the image writing module 106, configured to intercept and store image frames of a far end or a near end, wherein, the intercepted objects are determined by the determination module and the monitoring module, an audio writing module 108, configured to store voices in the call;

a synthesis module 110, configured to synthesize the audios and images selected by the determination module; and a storage module 112, configured to synthesize and store the images and pictures and audios of the audio writing module. Wherein, the synthesis of the images and the audios is an existing technology and is not repeated here.

Wherein, the image writing module 106 can be further divided into an image intercepting unit and an image writing unit, and the image intercepting unit is configured to intercept image frames of the key voice input end in accordance with the key voice input end notified by the monitoring module; and the image writing unit stores the intercepted image frames.

Specifically, the determination module 102 determines the key voice input end via one or any combination of the following modes:

making a determination according to whether there is voice input in a microphone, and if a voice input is received in the microphone, a terminal corresponding to the microphone is the key voice input end;

making a determination according to intensity of an audio signal, and if there are a plurality of voice inputs simultaneously, taking a party that has an audio signal with a higher intensity as the key voice input end; and making a determination according to a received speaking control instruction, and after receiving a speaking start instruction initiated by the terminal, taking a party that initiates the speaking start instruction as the key voice input end.

Figure 2:
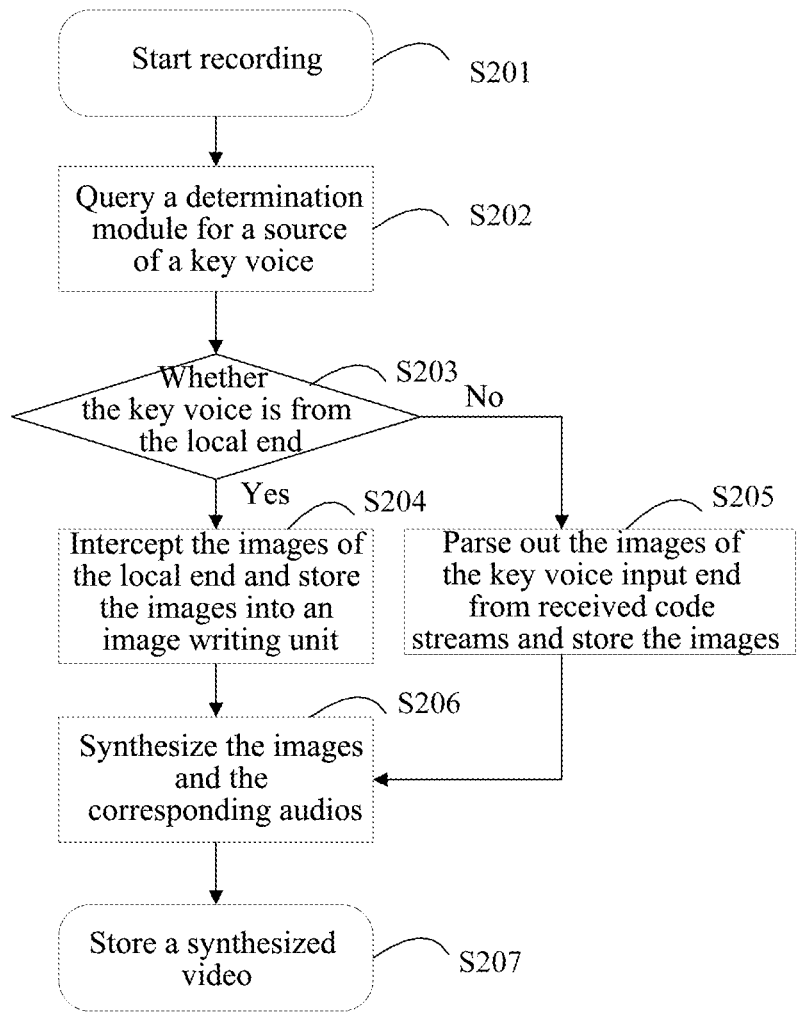
FIG. 2 is a flow chart of recording videos in a video call in accordance with an example of the present invention.

FIG. 2 is a flow chart of a method for recording videos in a video call according to an embodiment of the present invention, and the flow of the present example mainly comprises the following steps.

In step S201, a user initiates a video recording operation, and a terminal receives a video recording instruction and then is ready to record.

In step S202, the terminal queries a monitoring module for a source of the current key voice.

In step S203, according to the queried result in S202, whether the key voice is from a local end or a far end is determined, and if the key voice is from the local end, proceed to step S204, otherwise, proceed to step S205.

In step S204, an image intercepting unit intercepts images of the local end in accordance with a preset frequency, and stores the images in an image writing unit.

In step S205, the image intercepting unit intercepts the images of the far end in accordance with the preset frequency, and stores the images in the image writing unit, wherein, the intercepted object of the images of the far end is the key voice input end.

In step S206, the audios of the audio writing module and the images of the image writing module are synthesized into a video.

In step S207, the video is stored in a storage device.

Figure 3:
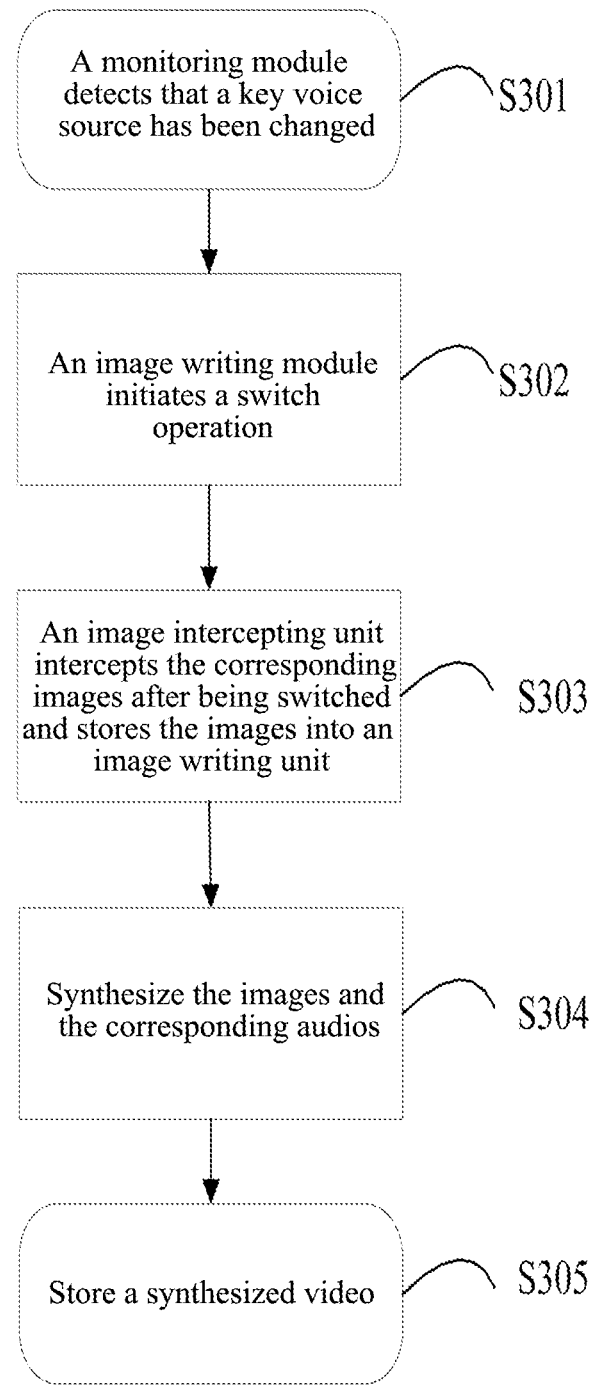
FIG. 3 is a flow chart of switching when a key voice input end is changed in accordance with an example of the present invention.

FIG. 3 is a flow chart of switching when a key voice input end is changed in accordance with an embodiment of the present invention, and a process of the present example mainly comprises the following steps.

In step S301, a monitoring unit detects that a key voice source has been changed, and a switch instruction is initiated to an image writing unit.

In step S302, the image writing module initiates a switch operation, and the intercepted object of the images is a terminal corresponding to a new key voice source.

In step S303, the image intercepting unit intercepts and stores the image after being switched in accordance with a preset frequency.

In step S304, the audios from the audio writing module and the images from the image writing module are synthesized into a video.

In step S305, the video is stored into the storage device.

The above description is only the preferred embodiments of the present invention and it is not intended to limit the present invention, the present invention can also have a variety of other examples. Without departing from the spirit and essence of the present invention, those skilled in the art can make various corresponding changes and variations based on the present invention, but all these changes and variations should belong to the protection scope of the appended claims in the present invention.

A person having ordinary skill in the art should understand that all or a part of the steps in the above method can be implemented by programs instructing related hardware, and the programs can be stored in a computer readable storage medium, such as a read-only memory, a disk, or a CD-ROM. Alternatively, all or a part of the steps in the aforementioned examples can also be implemented with one or more integrated circuits. Accordingly, various modules/units in the aforementioned examples can be implemented in a form of hardware, or can also be implemented in a form of software functional modules. The present invention is not limited to any particular form of combination of hardware and software.

INDUSTRIAL APPLICABILITY

Compared with the related art, the present invention solves a defect that the existing video call methods cannot record flexibly by determining a source of a key voice, acquiring an image corresponding to the key voice and synthesizing the image and a recorded audio, so that the recorded video has a larger storage and playback value, which improves the user experience, and also enables the video phones to be better promoted and applied.

What is claimed is:

1. A method for recording videos in a video call, comprising:
   determining a key voice input party of the video call, and acquiring an image of the key voice input party; wherein the key voice input party of the video call is determined through one or more of a voice input source, an intensity of an audio signal, and a speaking control instruction received from a terminal in the video call; and
   recording audio data of the video call, synthesizing the acquired image and the audio data, and then writing into one recorded video file of the video call.

2. The method of claim 1, wherein,
   in the step of determining the key voice input party of the video call, the key voice input party is determined by one or any combination of the following modes:
   making a determination according to whether there is a voice input in a microphone, wherein, if a voice input is received in the microphone, a terminal corresponding to the microphone is the key voice input party;
   making a determination according to intensity of an audio signal, wherein, if there are a plurality of voice inputs simultaneously, one party that has an audio signal with a higher intensity is taken as the key voice input party; and making a determination according to the received speaking control instruction, wherein, after a speaking start instruction initiated by a terminal is received, one party that initiates the speaking start instruction is taken as the key voice input party.

3. The method of claim 2, further comprising:

when the key voice input party of the video call is known to be changed, acquiring an image of a new key voice input party.

4. The method of claim 3, wherein, in the step of the key voice input party of the video call being known to be changed, the key voice input party of the video call is known to be changed according to a received switch instruction initiated by the terminal and/or by determining the key voice input party in real-time.

5. An apparatus for recording videos in a video call, comprising:

a determination module, configured to determine a key voice input party of the video call; wherein the key voice input party of the video call is determined through one or more of a voice input source, an intensity of an audio signal, and a speaking control instruction received from a terminal in the video call;

an image writing module, configured to acquire and record an image of the key voice input party;

an audio writing module, configured to record audio data of the video call;

a synthesis module, configured to synthesize the image acquired by the image writing module and the audio data acquired by the audio writing module and then write into one recorded video file of the video call; and a storage module, configured to store the video file.

6. The apparatus of claim 5, wherein, the determination module is configured to determine the key voice input party by one or any combination of the following modes:

making a determination according to whether there is a voice input in a microphone, wherein, if a plurality of voice inputs are received in the microphone, a terminal corresponding to the microphone is the key voice input party; and making a determination according to intensity of an audio signal, wherein, if there are a plurality of voice inputs simultaneously, one party that has an audio signal with a higher intensity is taken as the key voice input party.

7. The apparatus of claim 5, further comprising a monitoring module, wherein, the monitoring module is configured to monitor whether the key voice input party is changed, and notify the image writing module when the key voice input party is changed;

the image writing module is further configured to initiate a switch operation after receiving a notification from the monitoring module to acquire and store an image of a new key voice input party.

8. The apparatus of claim 7, wherein, the monitoring module is configured to monitor whether the key voice input party is changed according to determination results by the determination module.

9. The apparatus of claim 6, further comprising a monitoring module, wherein, the monitoring module is configured to monitor whether the key voice input party is changed, and notify the image writing module when the key voice input party is changed; and the image writing module is further configured to initiate a switch operation after receiving a notification from the monitoring module to acquire and store an image of a new key voice input party.

10. The apparatus of claim 9, wherein, the monitoring module is configured to monitor whether the key voice input party is changed according to determination results by the determination module.

* * * * *